US012763919B2

(12) United States Patent
Ramabadran et al.

(10) Patent No.: US 12,763,919 B2
(45) Date of Patent: Oct. 13, 2026

(54) FULL-DUPLEX TRANSCEIVER WITH DIGITAL POST-DISTORTION TO MITIGATE SELF-INTERFERENCE CAUSED BY TRANSMIT CHAINS

(71) Applicant: QUALCOMM Incorporated, San Diego, CA (US)

(72) Inventors: Prasidh Ramabadran, Reading (GB); Tejinder Dip Singh, Bangalore (IN); Bhargavi Janardhanan, Bangalore (IN); Veeresh Patil, Belagavi (IN); Bharath Kishore, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 18/909,362

(22) Filed: Oct. 8, 2024

(65) Prior Publication Data

US 2026/0100810 A1 Apr. 9, 2026

(51) Int. Cl.

*H04L 5/14* (2006.01)
*H04B 1/00* (2006.01)
*H04L 25/03* (2006.01)

(52) U.S. Cl.

CPC ......... *H04L 5/1423* (2013.01); *H04B 1/0096* (2013.01); *H04L 25/03006* (2013.01); *H04L 2025/03433* (2013.01)

(58) Field of Classification Search

CPC ............. H04L 5/1423; H04L 25/03006; H04L 2025/03433; H04L 5/1461; H04B 1/0096; H04B 1/525

See application file for complete search history.

(56) References Cited

U.S. PATENT DOCUMENTS

| | | | | |
|---|---|---|---|---|
| 2021/0328607 | A1* | 10/2021 | Wang | H04B 17/11 |
| 2022/0052718 | A1* | 2/2022 | Huang | H04B 1/0475 |
| 2023/0046481 | A1* | 2/2023 | Tarver | H04B 17/12 |
| 2023/0336321 | A1* | 10/2023 | Sim | H04L 5/1461 |
| 2024/0097869 | A1* | 3/2024 | Lee | H04B 17/345 |
| 2024/0305404 | A1* | 9/2024 | Li | H04L 1/0026 |
| 2025/0155549 | A1* | 5/2025 | Pandharipande | G01S 7/038 |

OTHER PUBLICATIONS

Kazuki Komatsu, Yuichi Miyaji and Hideyuki Uehara, Iterative Nonlinear Self-Interference Cancellation for In-Band Full-Duplex Wireless Communications Under Mixer Imbalance and Amplifier Nonlinearity, IEEE Transactions on Wireless Communications, vol. 19, No. 7, Jul. 2020 (Year: 2020).*

Nimrod Ginzberg, Dror Regev, Member, Genadiy Tsodik, Shimi Shilo, Doron Ezri, and Emanuel Cohen, "A Full-Duplex Quadrature Balanced RF Front End With Digital Pre-PA Self-Interference Cancellation", IEEE Transactions on Microwave Theory and Techniques, vol. 67, No. 12, Dec. 2019 (Year: 2019).*

Cristina Despina-Stoian, Roua Youssef, Angela Digulescu, Emanuel Radoi, Roland Gautier and Alexandru Serbanescu, "Widely-Linear Digital Self-Interference Cancellation in Full-Duplex USRP Transceiver", Sensors 2022, 22, 9607, Dec. 8, 2022 (Year: 2022).*

(Continued)

*Primary Examiner* — Aristocratis Fotakis
(74) *Attorney, Agent, or Firm* — Polsinelli / Qualcomm

(57) ABSTRACT

A transceiver is provided that mitigates self-interference during full-duplex operation using a digital post-distortion processing of the received signal.

20 Claims, 3 Drawing Sheets

(56) References Cited

OTHER PUBLICATIONS

Jie Zhang and Hongchao Wu, Simultaneous Transmit and Receive Phased Array System Architecture and Prototype Comprehensive Verification, ACES Journal, vol. 37, No. 12, Dec. 2022 (Year: 2022).*

Anttila L., et al., "Cancellation of Power Amplifier Induced Non-linear Self-Interference in Full-Duplex Transceivers", Arxiv.Org, Cornell University Library, 201 Olin Library Cornell University Ithaca, NY 14853, arXiv:1401.3129v1 [cs. IT], Jan. 14, 2014, XP080001828, 6 pages, cols. 4-7, Figure 1.

Bharadia D., et al., "Full Duplex Radios", SIGCOMM, ACM, 2 Penn Plaza, Suite 701 New York NY 10121-0701 USA, Aug. 27, 2013, XP058030650, pp. 375-386, cols. 10-12, Figure 3.

International Search Report and Written Opinion—PCT/US2025/044531—ISA/EPO—Dec. 10, 2025.

Montanari D., et al., "An FDD Wireless Diversity Receiver With Transmitter Leakage Cancellation in Transmit and Receive Bands", IEEE Journal of Solid-State Circuits, IEEE, USA, vol. 53, No. 7, Jul. 1, 2018, XP011685904, pp. 1945-1959, cols. 7-8, 12, Figure 3.

Nadh A., et al., "A Taylor Series Approximation Technique for Self-Interference Cancellation in Full-Duplex Radios", 2016 Twenty Second National Conference on Communication (NCC), IEEE, Mar. 4, 2016, XP032957115, 6 pages, col. 5, Figure 1.

Tamminen J., et al., "Digitally-Controlled RF Self-Interference Canceller for Full-Duplex Radios", 2016, 24th European Signal Processing Conference (EUSIPCO), EURASIP, Aug. 29, 2016, XP033011043, pp. 783-787, cols. 4-5, Figure 1.

* cited by examiner

FULL-DUPLEX TRANSCEIVER WITH DIGITAL POST-DISTORTION TO MITIGATE SELF-INTERFERENCE CAUSED BY TRANSMIT CHAINS

TECHNICAL FIELD

This application relates to wireless communication, and more particularly to the mitigation of self-interference in full-duplex operation.

BACKGROUND

As compared to older communication standards, the desired data rates for Fifth Generation New Radio (5G NR) are considerably increased. One way to achieve such higher data rates is the use of full-duplex operation in which a transceiver transmits simultaneously while receiving. But in a cellular handset, there is only so much space available for the transmit and receive antennas. The resulting limited separation between transmit and receive antennas on a handset will typically lead to substantial self-interference should the handset engage in a simultaneous uplink and downlink transmission despite the use of separate frequency bands for the uplink and downlink transmissions. In addition, a limited duplexer isolation also increases the self-interference. Moreover, the phase noise of a local oscillator (LO) signal used to down convert the received signal in frequency may create an image of the transmit signals within the receive signal bandwidth. The resulting self-interference causes gain compression in the receiver that may result in cross modulation of the received signal with the transmit signal. A similar self-interference may occur in the base station.

SUMMARY

In accordance with an aspect of the disclosure, a transceiver is provided that includes: a transmit path configured to convert a digital baseband transmit signal into an RF transmit signal and to transmit the RF transmit signal from the transceiver; a receive path configured to convert an RF receive signal into a digital baseband receive signal during full-duplex operation with the transmit path; and a baseband processor configured to process the digital baseband receive signal responsive to a function of a coupling coefficient that represents a self-interference coupling between the receive path and the transmit path to mitigate a self-interference component in the digital baseband receive signal.

In accordance with another aspect of the disclosure, a method is provided that includes: converting a first digital baseband transmit signal into a first RF transmit signal in a first transmit path in a transceiver; transmitting the first RF transmit signal from the transceiver while receiving an RF receive signal at the transceiver; converting the RF receive signal into a digital baseband receive signal in a receive path in the transceiver; and processing the digital baseband receive signal responsive to a function of the first digital baseband transmit signal and a first coupling coefficient that represents a self-interference coupling between the receive path and the first transmit path to mitigate a self-interference component in the digital baseband receive signal from the transmitting of the first RF transmit signal.

Finally, in accordance with yet another aspect of the disclosure, a method is provided that includes: during a calibration phase: generating a first sequence of digital baseband calibration signals and a second sequence of digital baseband calibration signals, wherein the first sequence of digital baseband calibration signals is orthogonal to the second sequence of digital baseband calibration signals; converting the first sequence of digital baseband calibration signals into a first sequence of RF calibration signals while converting the second sequence of digital baseband calibration signals into a second sequence of RF calibration signals; receiving a first RF signal sequence while transmitting the first sequence of RF calibration signals over a first transmit path and while transmitting the second sequence of RF calibration signals over a second transmit path; converting the first RF signal sequence into a sequence of digital baseband receive signals; and calculating a first coupling coefficient for the first transmit path by multiplying the sequence of digital baseband receive signals by the first sequence of digital baseband calibration signals.

These and other advantageous features may be better appreciated through the following detailed description.

BRIEF DESCRIPTION OF FIGURES

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
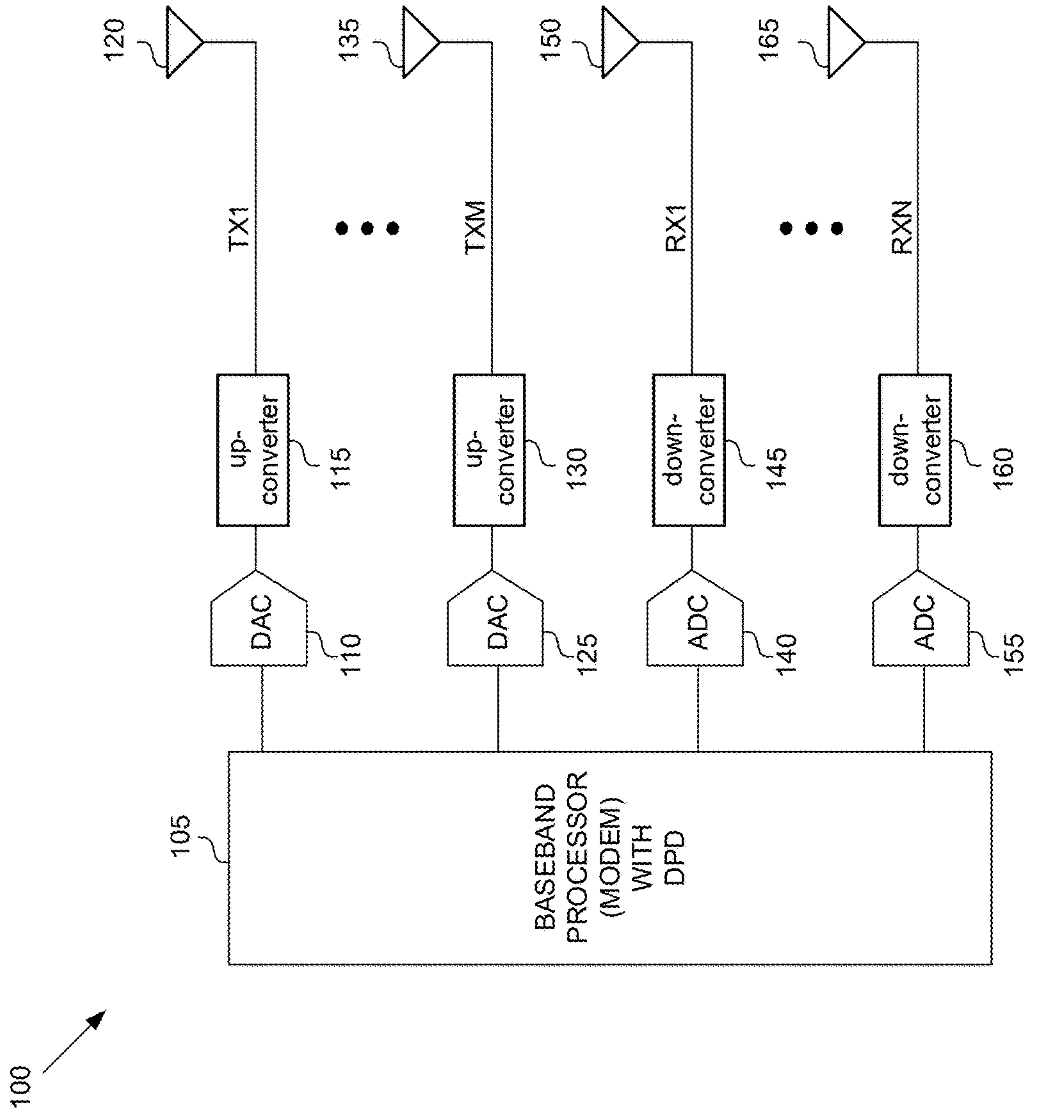
FIG. 1 illustrates a transceiver including a baseband processor configured to perform digital post-distortion processing in accordance with an aspect of the disclosure.

To combat the deleterious effects of self-interference, a transceiver may reduce the transmit signal power to reduce the second order intermodulation component and the reciprocal mixing component in the down-converted receive signal bandwidth. But the reduced transmit power reduces the transmit signal throughput. Alternatively, the filter poles for the baseband filtering of the receive signal may be tightened to increase the rejection of the transmit signal but at the cost of a reduced receive signal spectrum power and thus reduced receive signal throughput. In yet another approach, the low-noise amplifier (LNA) gain for the receiver may be reduced to reduce the intermodulation and cross-modulation components in the receive signal bandwidth. But this reduced LNA gain also reduces the receive signal throughput.

A transceiver is disclosed that advantageously mitigates self-interference through digital post-distortion processing. Through a digital processing of the received digital baseband signal, the digital post-distortion of the received digital baseband signal substantially eliminates the self-interference from the transmitted signal. The transmit and receive path gains thus need not be excessively reduced nor do the poles in the receive signal filtering need to be excessive. The resulting mitigation of the self-interference is thus quite advantageous as it does not require a substantial reduction in the transmit or receive data rates. Through a digital processing of the received digital baseband signal, the digital post-distortion of the received digital baseband signal substantially eliminates the self-interference from the transmitted signal.

The self-interference mitigation through digital post-distortion processing (DPD) may be better appreciated through a consideration of the following background concepts with respect to transmit and receive paths in the transceiver. A transmit path as defined herein refers to a path for a digital baseband transmit signal from a modem or baseband processor that converts a digital baseband transmit signal into an analog baseband transmit signal, up-converts the analog baseband transmit signal into a radio frequency (RF) transmit signal, and transmits the RF transmit signal over one or more transmit antennas. Similarly, a receive path as defined herein refers to a path from one or more receive antennas that receive an RF receive signal that is then down-converted in frequency to an analog baseband receive signal that is converted into a digital baseband receive signal for the baseband processor. A transceiver will thus have at least one transmit path and at least one receive path. More generally, a transceiver may have a plurality of transmit and receive paths.

In full-duplex operation, the transmit paths are active while the receive paths are active. The transmitted RF signal from each transmit path will thus couple by a corresponding coupling factor into each receive path. The digital baseband receive signals then undesirably include a self-interference component from the transmit paths. To mitigate this self-interference, a calibration phase is introduced herein that measures the coupling factor (which may also be denoted as a coupling coefficient) that represents the self-interference coupling between each transmit path and each receive path. For example, suppose that there are three transmit paths and four receive paths. For a first one of the receive paths, there would be three coupling coefficients, one for each of the transmit paths. Similarly, there are three coupling coefficients for each of the remaining receive paths to give a total of twelve coupling coefficients for such an implementation. More generally, for a transceiver with a plurality of M transmit paths and a plurality of N receive paths (N and M being positive integers), there would be a total of M×N coupling coefficients. The coupling coefficients may comprise real numbers or complex numbers.

To calculate the coupling coefficients during a calibration phase, a transceiver may transmit a corresponding orthogonal series of symbols or signals from each transmit path. In the following discussion, it will be assumed that that the modulation scheme is orthogonal frequency division multiplexing (OFDM) such that each symbol is an OFDM symbol, but it will be appreciated that the self-interference mitigation disclosed herein is applicable to other modulation schemes besides just OFDM. With the coupling coefficients being determined, the transceiver may terminate the calibration phase and transition to normal full-duplex operation. In normal full-duplex operation, the transceiver knows the digital baseband transmit signal driving each of the transmit paths. For a given receive path, the transceiver may thus multiply the digital baseband transmit signal for a transmit path by the coupling coefficient corresponding to the self-interference coupling between the receive path and the transmit path to determine the corresponding self-interference signal in the receive path's digital baseband receive signal. By subtracting this self-interference signal from the digital baseband receive signal in one implementation, the transceiver cancels the self-interference signal through digital post-distortion. Note that such a cancellation occurs at digital baseband prior to the decoding of the digital baseband receive signal. The cancellation may also occur during the following equalization and prior to the calculation of log-likelihood ratios as will be discussed further herein.

An example transceiver 100 will now be discussed in more detail with reference to FIG. 1. A baseband processor 105 implements the digital post-distortion (DPD) for mitigating self-interference with respect to a plurality of M transmit paths and a plurality of N receive paths, where M and N are positive plural integers. In some implementations, the baseband processor 105 may include a digital signal processor, one or more central processing units (CPUs), a channel coder, a modem, an interface module, and both volatile and non-volatile memories. For illustration clarity, these baseband processor components are not shown in FIG. 1. The M transmit paths range from a first transmit path TX1 to an Mth transmit path TXM. For illustration clarity, only the first transmit path TX1 and the Mth transmit path TXM are shown in FIG. 1 The first transmit path TX1 includes a digital-to-analog converter (DAC) 110 that converts a first digital baseband transmit signal into a first analog baseband transmit signal that is then up-converted in frequency in an up-converter 115 to form a first transmit RF signal that will be transmitted by one or more antennas (shown collectively as a single transmit antenna 120). Similarly, the Mth transmit path includes a DAC 125 that converts an Mth digital baseband transmit signal into an Mth analog baseband transmit signal that is then up-converted in frequency in an up-converter 130 to form an Mth transmit RF signal that will be transmitted by one or more antennas (shown collectively as a single transmit antenna 135). The remaining transmit paths are implemented analogously. It will be appreciated that the transmit paths are shown in simplified form and will include one or more filters and amplifiers as will be discussed further herein. Moreover, the up-converter and the DAC in each transmit path may be combined into a single direct-up-conversion stage in alternative implementations.

The N receive paths range from a first receive path RX1 to an Nth receive path RXN. The first receive path RX1 includes one or more receive antennas (shown collectively as a receive antenna 135) that receive a first RF receive signal that is then down-converted in frequency from the RF domain to the baseband domain by a down-converter 145 and then digitized by an analog-to-digital converter (ADC) 140 to form a first digital baseband receive signal at the modem processor 105. Similarly, the Nth receive path RXN includes one or more receive antennas (shown collectively as a receive antenna 165) that receive an Nth RF receive signal that is then down-converted in frequency from the RF domain to the baseband domain by a down-converter 160 and then digitized by an ADC 155 to form an Nth digital baseband receive signal at the modem processor 105. The remaining receive paths are implemented analogously. It will be appreciated that the receive paths are shown in simplified form and will include one or more filters and amplifiers as will be discussed further herein. Moreover, the down-converter and the ADC in each receive path may be combined into a single direct-down-conversion stage in alternative implementations. A calibration phase of operation for the transceiver 100 will now be discussed. During the calibration phase, the transceiver transmits calibration signal sequences from each transmit path. Should the receive paths be excessively saturated from the calibration signal sequence transmissions, the transmit power and/or a receive power of the receive paths may be reduced until an acceptable amount (or none) of saturation in the receive paths is detected. An analogous reduction in transmit power and/or receive power may be performed during normal operation following the calibration phase should the receive paths be excessively saturated.

Calibration Phase

Due to a variety of factors including the relatively close spacing between the transmit and receive antennas during full-duplex operation, each receive path receives a self-interference signal from each transmit path. For example, suppose that the first transmit path TX1 transmits a first OFDM symbol T1. In response, the first receive path RX1 receives a self-interference signal that equals $h_{11}$*T1, where $H_{11}$ is the self-interference coupling coefficient for the self-interference at the first receive path RX1 from the first transmit path TX1. At the same time, a second transmit path TX2 transmits a second OFDM symbol T2. In response, the first receive path RX1 receives a self-interference signal that equals $h_{12}$*T2, where $h_{12}$ is the coupling coefficient for the self-interference at the first receive path RX1 from the second transmit path TX2. At the same time, a third transmit path TX3 transmits a third OFDM symbol T3. In response, the first receive path RX1 receives a self-interference signal that equals $h_{13}$*T3, where $h_{13}$ is the coupling coefficient for the self-interference at the first receive path RX1 from the third transmit path TX3. The self-interference from the remaining transmit paths at the first receive path is analogous. For example, the Mth transmit path transmits an Mth OFDM symbol TM that causes the first receive path to receive a self-interference signal equaling $h_{1M}$*TM, where $h_{1M}$ is the coupling coefficient for the self-interference at the first receive path RX1 from the Mth transmit path TXM. It may thus be seen that the various coupling factors between the transmit paths and the receive paths may be represented by a matrix H in which the element $h_{ij}$ at the intersection of the ith row and the jth column in the H matrix is the coupling coefficient between the ith receive path and the jth transmit path. For example, a coupling coefficient $h_{21}$ represents the self-interference coupling between the second receive path and the first transmit path.

To determine the matrix H of the self-interference coupling coefficients during the calibration phase, the modem processor 105 transmits a plurality of sequences of digital baseband calibration signals, one for each transmit path. This may be done serially such that only one transmit chain transmits its sequences while the others wait their turn. Alternatively, the M transmit chains may transmit their sequences simultaneously with each other. A simultaneous transmission saves time but requires that the sequence for each transmit chain be orthogonal to the sequences for the remaining transmit chains. The following discussion will thus be directed to the use of orthogonal sequences, but it will be appreciated that such an orthogonality is unnecessary if only one transmit chain transmits at a time during the calibration phase. Since there are M transmit paths, the modem processor 105 would thus generate M orthogonal digital baseband calibration signal sequences. In an implementation in which the modulation scheme is OFDM, each sequence is formed by a plurality of K OFDM symbols, where K is a plural positive integer. The first transmit path TX1 would thus transmit a first sequence of K OFDM symbols, a second transmit path TX2 would transmit a second sequence of K OFDM symbols, and so on such the Mth transmit path TXM would transmit an Mth sequence of K OFDM symbols. In response, the ith receive path receives a product of the first sequence of K OFDM symbols from the first transmit path TX1 with the coupling coefficient $h_{i1}$, a product of the second sequence of K OFDM symbols from the second transmit path with the coupling coefficient $H_{i2}$, and so on such that the ith receive path receives a product of the Mth sequence of K OFDM symbols from the Mth transmit path TXM with the coupling coefficient $h_{1M}$. Each receive path thus receives simultaneously M sequences of K OFDM symbols (one sequence of K OFDM symbols from each transmit path). These received signals at a given receive path are converted into digital baseband form and received at the modem processor 105.

The K OFDM symbols are transmitted over some interval of time. To calculate the coupling factor element $H_{ij}$ in matrix H over this interval of time, the modem processor 105 may multiply the digital baseband receive signals from the ith receive path with the digital baseband version of the K OFDM symbols from the jth transmit path. Since the sequence of K OFDM symbols from the jth transmit path are orthogonal to the sequences of K OFDM symbols from the remaining M−1 transmit paths, the resulting product is proportional to the coupling coefficient $h_{ij}$. All the coupling coefficients may thus be determined at the same time by the modem processor 105. In addition, the orthogonal sequences may be repeatedly transmitted. The modem processor 105 may thus form a first estimate of the H matrix from the first orthogonal sequence from each transmit path, a second estimate of the H matrix from the second orthogonal sequence from each transmit path, and so on such that an averaged estimate of the H matrix from the individual sequences may be performed. In other implementations, the H matrix may be calculated from just one orthogonal sequence interval. With the H matrix calculated, the transceiver 100 may transition to normal operation. Note that the self-interference will tend to change such as due to how a user holds the handset and other factors. Calibration is thus periodically repeated to refresh the H matrix estimate. Calibration may also be performed during power-up and also at manufacture. During normal operation, digital post-distortion processing of the digital baseband receive signals may occur to mitigate the self-interference as follows.

Normal Full-Duplex Operation

The digital post-distortion to mitigate the self-interference during normal full-duplex operation following the calibration phase may be performed using two main implementations. In a first implementation, the transmit signal envelope in the digital baseband receive signal for a given receive path is substantially eliminated using the coupling coefficients from the row in the H matrix corresponding to the given receive path and the transceiver's knowledge of the transmit signals. For example, to eliminate the transmit signal envelope from the digital baseband receive signal for the first receive signal path RX1 in the transceiver 100, the baseband processor 105 may multiply the digital baseband representation of the OFDM symbol being transmitted by each transmit chain with the corresponding coupling coefficient. The transmit signal envelope cancellation may thus proceed on a symbol-by-symbol basis. To provide a better appreciation of this multiplication, suppose that the digital baseband representation of an OFDM symbol transmitted by the first transmit path is denoted as T1. Similarly, the digital baseband representation of an OFDM symbol transmitted by the second transmit path is denoted as T2, and so on such that the digital baseband representation of an OFDM symbol transmitted by the Mth transmit path is denoted as TM. To eliminate the transmit signal envelope from the digital baseband receive signal from the ith receive path, the baseband processor 105 may form the sum of the following equation (1):

$$\sum_{j=1}^{M} h_{ij} * T_j \quad \text{Eq. (1)}$$

where $T_j$ is the digital baseband representation of the OFDM symbol transmitted by the jth transmit path and $h_{ij}$ is the coupling coefficient between the jth transmit path and the ith receiver path. It will be appreciated that Equation (1) is just an example of numerous ways in which the coupling coefficients may be used in a digital post-distortion calculation to substantially eliminate the transmit signal envelope. For example, in alternative calculation, the matrix H may be inverted and multiplied by the received signals in a post-distortion processing calculation to substantially eliminate the transmit signal envelope.

In a second implementation, the log-likelihood ratio (LLR) computation in the baseband processor 105 may be adjusted based upon the transmit signal envelope. In particular, the baseband processor 105 implements an equalizer that uses a matrix (such as denoted as a matrix C) to equalize the effects of the downlink channel on the received signal. The matrix C has a plurality of j rows and columns where j is the number of receive paths. In the following discussion, a variable y is deemed to represent the combined digital baseband receive signal from the various receive paths. This combined digital baseband receive signal y includes the self-interference contribution. The matrix multiplication C*y is the input to the LLR computation, but this product includes the self-interference contribution. To mitigate the self-interference, the baseband processor 105 may subtract a product C*e from the input to the LLR computation, where e equals a product of the matrix H and x, wherein x is a vector representing the known OFDM inputs to the transmit paths.

Regardless of how the self-interference is mitigated using the matrix H, the resulting self-interference mitigation is quite advantageous. For example, the 5G Non-Standalone Mode (NSA) uses simultaneous operation in a 4G band for the control signals while the 5G band is used for data. These channels may be harmonically related such as control signal transmitting over band b8 while receiving data signaling in band n41. A transceiver using a double-balanced mixer may suppress the third harmonic of the band b8 by only about 10 dB. In the receive paths, a harmonic-rejection mixer for band n41 can only suppress the third harmonic of the band b8 by around 25 dB. Even if the transceiver's RF front-end suppresses the third harmonic by another 60 dB, the remaining self-interference is still enough to de-sensitize the receiver performance in the n41 band. But the digital post-distortion disclosed herein will mitigate this self-interference. Note that the cancellation of self-interference may be selectively applied to only the transmit chains that couple sufficiently to the receive chains. The selection of the sufficiently self-interfering transmit chains may be performed at manufacture or during runtime.

Figure 2:
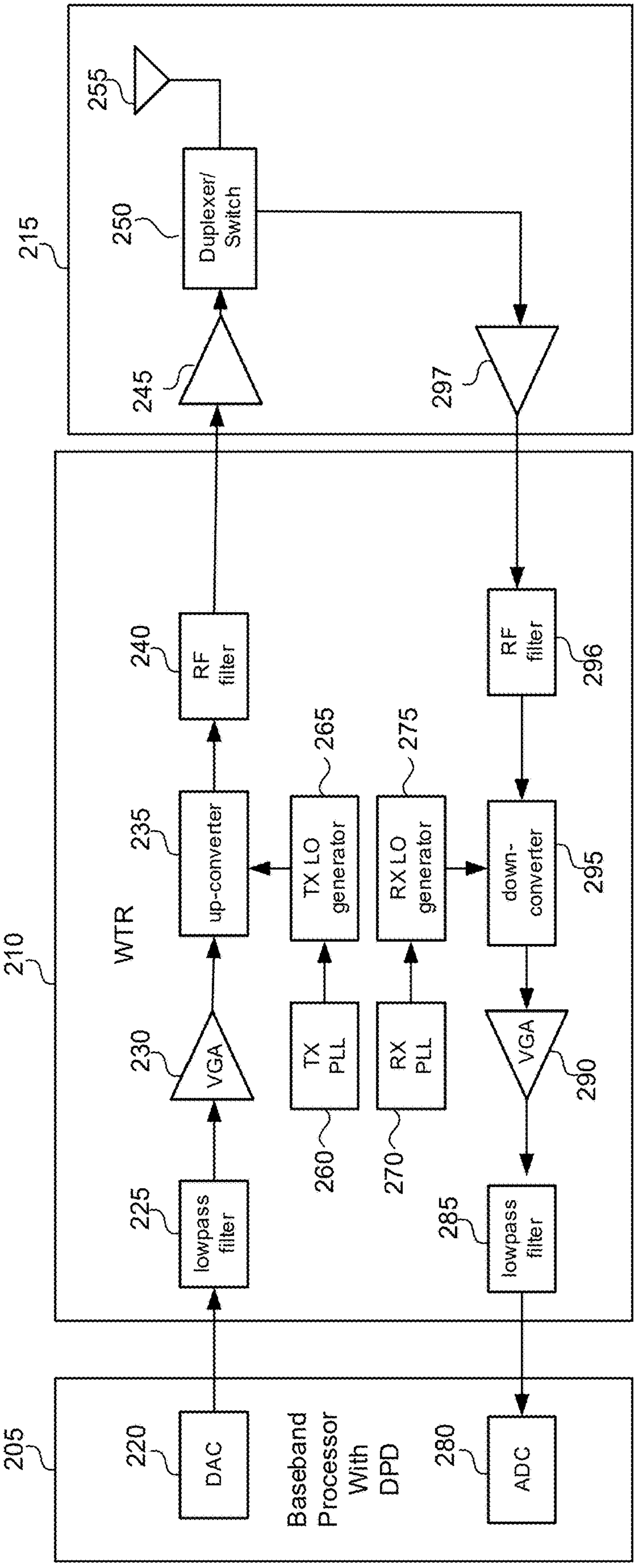
FIG. 2 illustrates a wireless communication system including a transceiver having a baseband processor configured to perform digital post-distortion processing in accordance with an aspect of the disclosure.

A wireless communication device 200 such as a cellular telephone with digital post-distortion for self-interference mitigation is shown in more detail in FIG. 2. A baseband processor (modem) 205 includes at least one digital-to-analog converter (DAC) 220 for generating an analog baseband transmit signal for an at least one transmit path. A wireless transceiver integrated circuit (WTR) 210 includes a lowpass filter 225 for filtering the analog baseband transmit signal to provide a filtered analog signal to a variable gain amplifier (VGA) 230. In some implementations, the DAC 220 may be part of the WTR 210. An up-converter 235 (such as one or more mixers) up-converts an amplified analog baseband signal from the VGA 230 in frequency to produce an RF signal. For example, the up-converter 235 may mix the amplified analog baseband signal with a local oscillator (LO) signal from a transmit (TX) LO generator 265. An oscillator such as a TX phase-locked loop (PLL) 260 clocks the TX LO generator 265 for the generation of the TX LO signal. An RF filter 240 filters the RF signal from the up-converter 235 to produce an RF input signal.

A front-end module 215 includes a power amplifier 245 for amplifying the RF input signal. It will be appreciated that additional stages of amplification of the RF input signal prior to the power amplifier 245 such as a pre-driver amplifier (not illustrated) and a driver amplifier (not illustrated) may also be used in alternative implementations. The power amplifier 245 may be a Doherty amplifier in some implementations. An amplified RF output signal from the power amplifier 245 passes through an antenna switch module (duplexer/switch) 250 to an antenna(s) 255 for wireless transmission. In some implementations, the front-end module 215 could be optional or aspects or components of the WTR 210 and the front-end module 215 could be combined into one IC or various components could be split among different ICs or packages in different configurations.

During a receive mode, a received RF signal from the antenna(s) 255 passes through the antenna switch module 250 to a low-noise amplifier 297. The transmit and receive paths disclosed herein may thus share one or more antennas operating as both the transmit antenna(s) and also the receive antenna(s). The WTR 210 also includes an RF filter 296 for filtering an amplified RF receive signal from the LNA 297. A down-converter 295 (such as one or more mixers) down converts the filtered RF signal from the RF filter 296 in frequency to produce a down-converted analog signal. For example, the down-converter 295 may mix the filtered RF signal with an LO signal from a receive (RX) LO generator 275. An oscillator such as an RX phase-locked loop (PLL) 270 clocks the RX LO generator 275 for the generation of the RX LO signal. Another VGA 290 amplifies the down-converted analog signal from the down-converter 295 to drive a lowpass filter 285 that provides a filtered analog baseband signal to an analog-to-digital (ADC) 280 in the baseband processor 205. The analog-to-digital converter (ADC) 280 recovers the digital baseband receive signal for further digital post-distortion processing as disclosed herein by the baseband processor 205. It will be appreciated that the WTR 210 and the RF front end 215 are merely exemplary and that other transceiver architectures may be used in conjunction with the self-interference mitigation disclosed herein.

Figure 3:
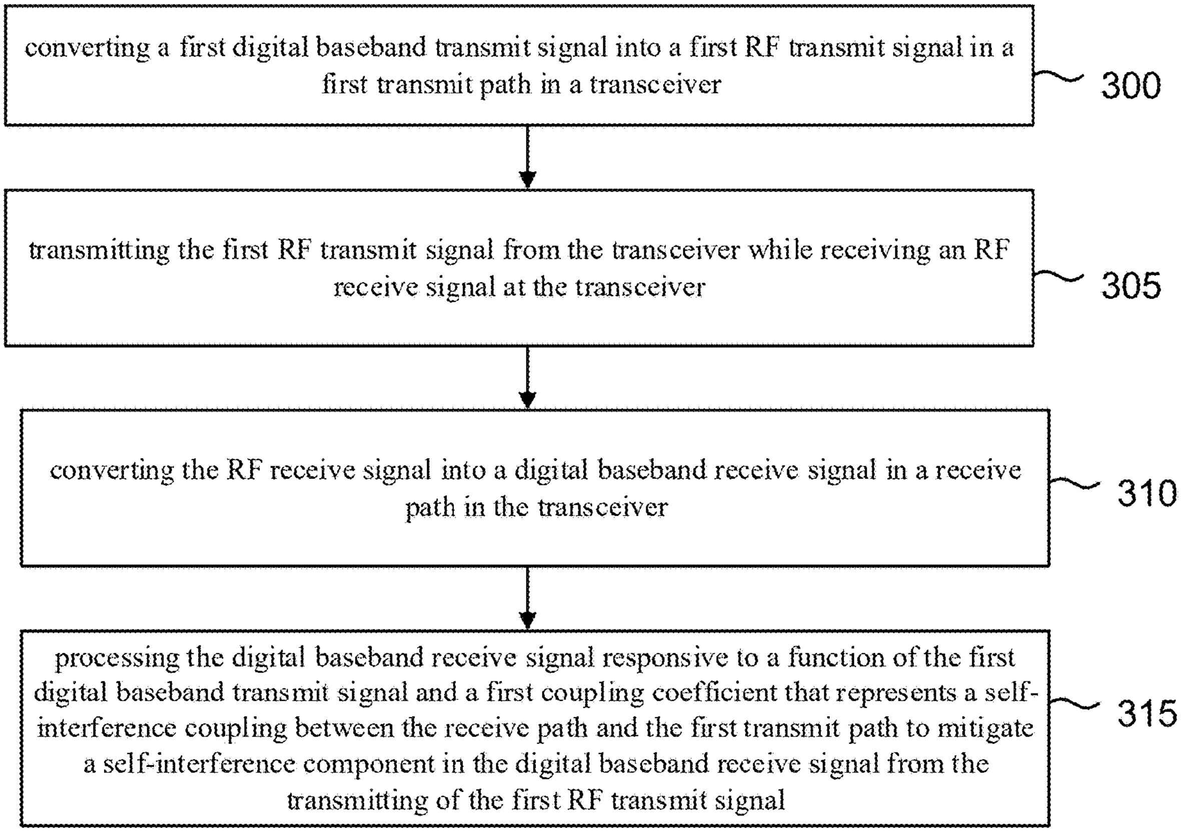
FIG. 3 is a flowchart for a method of mitigating self-interference during full-duplex operation in accordance with an aspect of the disclosure.

An example method of self-interference mitigation will now be discussed with reference to the flowchart of FIG. 3. The method includes an act 300 of converting a first digital baseband transmit signal into a first RF transmit signal in a first transmit path in a transceiver. The analog conversion and up-converting in frequency of the corresponding digital baseband transmit in any of the transmit paths in the transceiver 100 is an example of act 300. The method further includes an act 305 of transmitting the first RF transmit signal from the transceiver while receiving an RF receive signal at the transceiver. The full-duplex normal operation of the transceiver 100 following the calibration phase is an example of act 305. In addition, the method includes an act 310 of converting the RF receive signal into a digital baseband receive signal in a receive path in the transceiver. The digital conversion and down-conversion in frequency in any of the receive paths in the transceiver 100 is an example of act 310. Finally, the method includes an act 315 of processing the digital baseband receive signal responsive to a function of the first digital baseband transmit signal and a first coupling coefficient that represents a self-interference coupling between the receive path and the first transmit path to mitigate a self-interference component in the digital baseband receive signal from the transmitting of the first RF transmit signal. The two main implementations of the self-interference mitigation as discussed with regard to normal full-duplex operation of the transceiver are examples of act 315.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems besides 5G (or 6G) as defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The disclosure will now be summarized through the following example clauses:

Clause 1. A transceiver, comprising:

a transmit path configured to convert a digital baseband transmit signal into an RF transmit signal and to transmit the RF transmit signal from the transceiver;

a receive path configured to convert an RF receive signal into a digital baseband receive signal during full-duplex operation with the transmit path; and a baseband processor configured to process the digital baseband receive signal responsive to a function of a coupling coefficient that represents a self-interference coupling between the receive path and the transmit path to mitigate a self-interference component in the digital baseband receive signal.

Clause 2. The transceiver of clause 1, wherein the baseband processor is further configured to process the digital baseband receive signal responsive to the function of the coupling coefficient through:

a multiplication of the digital baseband transmit signal with the coupling coefficient to form a product; and a subtraction of the product from the digital baseband receive signal to mitigate the self-interference component.

Clause 3. The transceiver of clause 1, wherein the baseband processor includes an equalizer configured to equalize the digital baseband receive signal to form an equalized digital baseband receive signal, wherein the baseband processor is further configured to process the digital baseband receive signal responsive to the function of the coupling coefficient through:

a multiplication of the digital baseband transmit signal with the coupling coefficient to form a product, wherein the equalizer is further configured to equalize the product to form an equalized product; and a subtraction of the equalized product from the equalized digital baseband receive signal to form a mitigated equalized digital baseband receive signal to mitigate the self-interference component.

Clause 4. The transceiver of clause 3, wherein the baseband processor is further configured to compute a log-likelihood ratio from the mitigated equalized digital baseband receive signal to decode the mitigated equalized digital baseband receive signal.

Clause 5. The transceiver of any of clauses 1-4, wherein the transmit path comprises a plurality of transmit paths, and wherein the coupling coefficient comprises a plurality of coupling coefficients corresponding to the plurality of transmit paths, each coupling coefficient representing a self-interference coupling between the receive path and a corresponding one of the transmit paths.

Clause 6. The transceiver of clause 5, wherein the receive path comprises a plurality of receive paths.

Clause 7. The transceiver of any of clauses 1-4, wherein the first transmit path includes a digital-to-analog converter configured to convert the digital baseband transmit signal into an analog baseband transmit signal and includes an up-converter configured to up-convert the analog baseband transmit signal in frequency to form the RF transmit signal.

Clause 8. The transceiver of any of clauses 1-4 and 7, wherein the receive path includes a down-converter configured to down-convert the RF receive signal in frequency to form an analog baseband receive signal and includes an analog-to-digital converter configured to convert the analog baseband receive signal into the digital baseband receive signal.

Clause 9. The transceiver of any of clauses 1-8, wherein the transceiver is included in a cellular telephone.

Clause 10. A method of mitigating self-interference, comprising:

converting a first digital baseband transmit signal into a first RF transmit signal in a first transmit path in a transceiver;

transmitting the first RF transmit signal from the transceiver while receiving an RF receive signal at the transceiver;

converting the RF receive signal into a digital baseband receive signal in a receive path in the transceiver; and processing the digital baseband receive signal responsive to a function of a first coupling coefficient that represents a self-interference coupling between the receive path and the first transmit path to mitigate a self-interference component in the digital baseband receive signal from the transmitting of the first RF transmit signal.

Clause 11. The method of clause 10, wherein processing the digital baseband receive signal responsive to the function of the first coupling coefficient comprises:

multiplying the first digital baseband transmit signal with the first coupling coefficient to form a first product; and subtracting the first product from the digital baseband receive signal to mitigate the self-interference component.

Clause 12. The method of clause 10, further comprising:

processing the digital baseband receive signal through an equalizer to form an equalized digital baseband receive signal, wherein processing the digital baseband receive signal responsive to the function of the first digital baseband transmit signal and the coupling coefficient comprises:

multiplying the first digital baseband transmit signal with the first coupling coefficient to form a first product;

processing the first product through the equalizer to form an equalized product; and subtracting the equalized product from the equalized digital baseband receive signal to form a mitigated equalized digital baseband receive signal to mitigate the self-interference component.

Clause 13. The method of clause 12, further comprising:

computing a log-likelihood ratio from the mitigated equalized digital baseband receive signal to decode the mitigated equalized digital baseband receive signal.

Clause 14. The method of any of clauses 10-11, further comprising:

converting a second digital baseband transmit signal into a second RF transmit signal in a second transmit path in the transceiver; and transmitting the second RF transmit signal from the transceiver while receiving the RF receive signal at the transceiver, wherein processing the digital baseband receive signal is also responsive to a second function of the second digital baseband transmit signal and a second coupling coefficient that represents a self-interference coupling between the receive path and the second transmit path.

Clause 15. The method of clause 14, wherein processing the digital baseband receive signal responsive to the second function comprises:

multiplying the second digital baseband transmit signal with the second coupling coefficient to form a second product; and subtracting the second product from the digital baseband receive signal to further mitigate the self-interference component.

Clause 16. The method of any of clauses 10-15, wherein transmitting the first RF transmit signal from the transceiver comprises transmitting a 4G control signal, and wherein receiving the RF receive signal at the transceiver comprises receiving a 5G data signal.

Clause 17. A method of mitigating self-interference, comprising:

during a calibration phase:

generating a first sequence of digital baseband calibration signals and a second sequence of digital baseband calibration signals, wherein the first sequence of digital baseband calibration signals is orthogonal to the second sequence of digital baseband calibration signals;

converting the first sequence of digital baseband calibration signals into a first sequence of RF calibration signals while converting the second sequence of digital baseband calibration signals into a second sequence of RF calibration signals;

receiving a first RF signal sequence over a receive path while transmitting the first sequence of RF calibration signals over a first transmit path and while transmitting the second sequence of RF calibration signals over a second transmit path;

converting the first RF signal sequence into a sequence of digital baseband receive signals; and calculating a first coupling coefficient for the first transmit path by multiplying the sequence of digital baseband receive signals by the first sequence of digital baseband calibration signals.

Clause 18. The method of clause 17, further comprising:

calculating a second coupling coefficient for the second transmit path by multiplying the sequence of digital baseband receive signals by the second sequence of digital baseband calibration signals.

Clause 19. The method of any of clauses 17-18, further comprising:

during a normal mode of operation following the calibration phase:

performing full-duplex operation over the first transmit path and the receive path; and mitigating a self-interference from the full-duplex operation using a function of a transmit signal transmitted during the full-duplex operation and the first coupling coefficient.

Clause 20. The method of clause 19, further comprising:

determining whether a low-noise amplifier in the receive path is saturated during the normal mode of operation; and lowering a transmit power of the first transmit path and lowering a transmit power of the second transmit path and/or lowering a receive power of the receive path responsive to a determination that the low-noise amplifier in the receive path is saturated.

Clause 21. A non-transient computer-readable medium containing program instructions for causing a processor to perform the method of:

processing a digital baseband receive signal responsive to a function of a first coupling coefficient that represents a self-interference coupling between a receive path and a first transmit path to mitigate a self-interference component in the digital baseband receive signal from the transmitting of the first RF transmit signal.

Clause 22. A transceiver, comprising:

a transmit path configured to convert a digital baseband transmit signal into an RF transmit signal and to transmit the RF transmit signal from the transceiver;

a receive path configured to convert an RF receive signal into a digital baseband receive signal during full-duplex operation with the transmit path; and means for processing the digital baseband receive signal responsive to a function of a coupling coefficient that represents a self-interference coupling between the receive path and the transmit path to mitigate a self-interference component in the digital baseband receive signal.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A transceiver, comprising:

a transmit path configured to convert a digital baseband transmit signal into an RF transmit signal and to transmit the RF transmit signal from the transceiver;

a receive path configured to convert an RF receive signal into a digital baseband receive signal during full-duplex operation with the transmit path; and a baseband processor configured to process the digital baseband receive signal responsive to a function of a coupling coefficient that represents a self-interference coupling between the receive path and the transmit path to mitigate a self-interference component in the digital baseband receive signal; wherein the coupling coefficient is determined during a calibration phase based on multiplying a sequence of digital baseband receive signals by a sequence of digital baseband calibration signals transmitted over the transmit path.

2. The transceiver of claim 1, wherein the baseband processor is further configured to process the digital baseband receive signal responsive to the function of the coupling coefficient through:

a subtraction of a product from the digital baseband receive signal to mitigate the self-interference component.

3. The transceiver of claim 1, wherein the baseband processor includes an equalizer configured to equalize the digital baseband receive signal to form an equalized digital baseband receive signal, wherein the baseband processor is further configured to process the digital baseband receive signal responsive to the function of the coupling coefficient through:

a multiplication of the digital baseband transmit signal with the coupling coefficient to form a product, wherein the equalizer is further configured to equalize the product to form an equalized product; and a subtraction of the equalized product from the equalized digital baseband receive signal to form a mitigated equalized digital baseband receive signal to mitigate the self-interference component.

4. The transceiver of claim 3, wherein the baseband processor is further configured to compute a log-likelihood ratio from the mitigated equalized digital baseband receive signal to decode the mitigated equalized digital baseband receive signal.

5. The transceiver of claim 1, wherein the transmit path comprises a plurality of transmit paths, and wherein the coupling coefficient comprises a plurality of coupling coefficients corresponding to the plurality of transmit paths, each coupling coefficient representing a self-interference coupling between the receive path and a corresponding one of the plurality of transmit paths.

6. The transceiver of claim 5, wherein the receive path comprises a plurality of receive paths.

7. The transceiver of claim 1, wherein the transmit path includes a digital-to-analog converter configured to convert the digital baseband transmit signal into an analog baseband transmit signal and includes an up-converter configured to up-convert the analog baseband transmit signal in frequency to form the RF transmit signal.

8. The transceiver of claim 1, wherein the receive path includes a down-converter configured to down-convert the RF receive signal in frequency to form an analog baseband receive signal and includes an analog-to-digital converter configured to convert the analog baseband receive signal into the digital baseband receive signal.

9. The transceiver of claim 1, wherein the transceiver is included in a cellular telephone.

10. A method of mitigating self-interference, comprising:

converting a first digital baseband transmit signal into a first RF transmit signal in a first transmit path in a transceiver;

transmitting the first RF transmit signal from the transceiver while receiving an RF receive signal at the transceiver;

converting the RF receive signal into a digital baseband receive signal in a receive path in the transceiver; and processing the digital baseband receive signal responsive to a function of a first coupling coefficient that represents a self-interference coupling between the receive path and the first transmit path to mitigate a self-interference component in the digital baseband receive signal from the transmitting of the first RF transmit signal; wherein the first coupling coefficient is determined during a calibration phase based on multiplying a sequence of digital baseband receive signals by a sequence of digital baseband calibration signals transmitted over the first transmit path.

11. The method of claim 10, wherein processing the digital baseband receive signal responsive to the function of the first coupling coefficient comprises:

subtracting a first product from the digital baseband receive signal to mitigate the self-interference component.

12. The method of claim 10, further comprising:

processing the digital baseband receive signal through an equalizer to form an equalized digital baseband receive signal, wherein processing the digital baseband receive signal responsive to the function of the first coupling coefficient comprises:

multiplying the first digital baseband transmit signal with the first coupling coefficient to form a first product;

processing the first product through the equalizer to form an equalized product; and subtracting the equalized product from the equalized digital baseband receive signal to form a mitigated equalized digital baseband receive signal to mitigate the self-interference component.

13. The method of claim 12, further comprising:

computing a log-likelihood ratio from the mitigated equalized digital baseband receive signal to decode the mitigated equalized digital baseband receive signal.

14. The method of claim 10, further comprising:

converting a second digital baseband transmit signal into a second RF transmit signal in a second transmit path in the transceiver; and transmitting the second RF transmit signal from the transceiver while receiving the RF receive signal at the transceiver, wherein processing the digital baseband receive signal is also responsive to a second function of the second digital baseband transmit signal and a second coupling coefficient that represents a self-interference coupling between the receive path and the second transmit path.

15. The method of claim 14, wherein processing the digital baseband receive signal responsive to the second function comprises:

multiplying the second digital baseband transmit signal with the second coupling coefficient to form a second product; and subtracting the second product from the digital baseband receive signal to further mitigate the self-interference component.

16. The method of claim 10, wherein transmitting the first RF transmit signal from the transceiver comprises transmitting a 4G control signal, and wherein receiving the RF receive signal at the transceiver comprises receiving a 5G data signal.

17. A method of mitigating self-interference, comprising:

during a calibration phase:

generating a first sequence of digital baseband calibration signals and a second sequence of digital baseband calibration signals, wherein the first sequence of digital baseband calibration signals is orthogonal to the second sequence of digital baseband calibration signals;

converting the first sequence of digital baseband calibration signals into a first sequence of RF calibration signals while converting the second sequence of digital baseband calibration signals into a second sequence of RF calibration signals;

receiving a first RF signal sequence over a receive path while transmitting the first sequence of RF calibration signals over a first transmit path and while transmitting the second sequence of RF calibration signals over a second transmit path;

converting the first RF signal sequence into a sequence of digital baseband receive signals; and calculating a first coupling coefficient for the first transmit path by multiplying the sequence of digital baseband receive signals by the first sequence of digital baseband calibration signals.

18. The method of claim 17, further comprising:

calculating a second coupling coefficient for the second transmit path by multiplying the sequence of digital baseband receive signals by the second sequence of digital baseband calibration signals.

19. The method of claim 17, further comprising:

during a normal mode of operation following the calibration phase:

performing full-duplex operation over the first transmit path and the receive path; and mitigating a self-interference from the full-duplex operation using a function of a transmit signal transmitted during the full-duplex operation and the first coupling coefficient.

20. The method of claim 19, further comprising:

determining whether a low-noise amplifier in the receive path is saturated during the normal mode of operation; and lowering a transmit power of the first transmit path and lowering a transmit power of the second transmit path and/or lowering a receive power of the receive path responsive to a determination that the low-noise amplifier in the receive path is saturated.

* * * * *